United States Patent [19]

Frouin

[11] Patent Number: 5,134,541
[45] Date of Patent: Jul. 28, 1992

[54] DISTRIBUTION STATION FOR WATER AND/OR GAS AND/OR FUEL AND/OR ELECTRICITY AND/OR ANY OTHER FLUID

[76] Inventor: Daniel Frouin, Le Fut Leve, 44810 Heric, France

[21] Appl. No.: 613,259

[22] Filed: Nov. 15, 1990

[30] Foreign Application Priority Data

Nov. 15, 1989 [FR] France .................. 89 15148

[51] Int. Cl.$^5$ .............................................. H02B 9/00
[52] U.S. Cl. .................................... 361/334; 137/356; 174/38; 361/357; 361/364
[58] Field of Search .................. 174/38, 50; 312/100; 137/356, 363, 364, 371; 361/331, 332, 334, 356, 357, 364, 365, 369; 222/182, 183, 184, 192; 324/156

[56] References Cited

U.S. PATENT DOCUMENTS

| | | | |
|---|---|---|---|
| 3,891,899 | 6/1975 | Sparling | 361/364 |
| 4,266,266 | 5/1981 | Sanner | 361/357 |
| 4,307,436 | 12/1981 | Eckart | 361/363 |
| 4,785,376 | 11/1988 | Dively | |
| 4,951,182 | 8/1990 | Simonson | 362/145 |

FOREIGN PATENT DOCUMENTS

WO81/02495  9/1981  World Int. Prop. O.

OTHER PUBLICATIONS

123 Engineering, 228, No. 8, Sep. 1988, p. 407.

*Primary Examiner*—Gerald P. Tolin
*Attorney, Agent, or Firm*—Young & Thompson

[57] ABSTRACT

The invention relates to a distribution station for water and/or gas and/or fuel and/or electricity and/or any other fluid, particularly for parking areas. This station is notable in that it comprises an anti-vandalism enclosure (23) sheltering at least a distributor (40) of water or of gas or of fuel or of any other fluid and/or an electricity distributor (46), each distributor coacting with a flow control device (41-46a), associated with corresponding control means (52) operational according to the payment for the service rendered. The invention is useful in campgrounds, communal wayside stations, locations reserved for travelers.

11 Claims, 4 Drawing Sheets

DISTRIBUTION STATION FOR WATER AND/OR GAS AND/OR FUEL AND/OR ELECTRICITY AND/OR ANY OTHER FLUID

FIELD OF THE INVENTION

Background of the Invention

The invention relates to a distribution station for water and/or gas and/or fuel and/or electricity and/or any other fluid, which cannot be vandalized, broken into, and which accepts payment for the service rendered.

Before describing the principal features of the invention, there will be recounted the difficulties encountered in the distribution of water and electricity, particularly for travelers who will stay temporarily at authorized locations equipped or not for this purpose.

There are already known a certain number of stations designated most often by distribution terminals such as those which are provided at pleasure resorts. These outlets, at the disposal of guests of the resorts, comprise most often a valve or tap for distribution of water as well as an electrical outlet. At such outlets access to the tap or outlet is free, the cost of consumption being borne by the management of the resort or the marina and charged to the users. Such outlets are not adapted to temporary campgrounds for travelers because their arrangement and payment for the service rendered is not amenable to the constraints to which they are subjected by reason particularly of the absence of attendants.

At campgrounds for travelers, provided most often by municipalities, there is no way to monitor, because of lack of appropriate means, the consumption of water and electricity other than by an arbitrary payment for a limited time. The result is uncontrolled consumption at the cost of the communities, recovered from permanent inhabitants which creates conflict between the permanent administration and the municipalities, with the result that travelers are not welcome.

It would therefore be desirable to have a distribution station for water and electricity which is adaptable to the technical and economical requirements specific to their use at campgrounds for travelers, particularly but not exclusively to their use at campgrounds reserved for travelers, as for example unattended small municipal campgrounds, small wayside stations, etc.

SUMMARY OF THE INVENTION

The invention relates for this purpose to a distribution station for water and/or gas and/or fuel and/or electricity and/or any other fluid particularly for stopping places such as campgrounds, community wayside stations, places reserved for travelers, and particularly unattended stopping places, which distribution station is characterized in that it comprises an enclosure that cannot be vandalized protecting at least a distributor of water or gas or fuel or any other fluid and/or an electrical distributor, said distributor of water or gas or fuel or any other fluid comprising a valve or tap fed by a flow control device actuated by control means according to the amount of payment for the service rendered, said electricity distributor working also under the action of control means according to the payment for the service rendered.

According to one characteristic, the non-vandalizable enclosure protecting the distributors comprises a massive foundation that reduces the perimeter of access, and comprises an axial mast to prevent sinking, about which is assembled in a manner which cannot be disassembled with the usual or blunt instruments, the enclosure, whose lower end encloses said foundation, preferably by mortising which is locked in rotation, so as to create a space coaxial with the mast to contain the distributors of the station and their control accessories.

According to another characteristic, the enclosure protecting the distributors has the form of a cylindrical sleeve whose upper part is closed by a cupola which cannot be broken into, bordering the outline of the enclosure, said cupola being fastened to the mast and to the foundation by means of a screw-threaded rod fixed to the head of the mast and a nut, preferably of anti-gripping shape, applied to the cupola and the enclosure on said foundation.

Thanks to these principal arrangements, the distribution station cannot be broken into, cannot be vandalized, is proof against theft, and permits making profitable the installations by rendering them reliable under difficult conditions of use without constant surveillance.

The control arrangement for paid consumption encourages communities to install camping grounds for travelers or others passing through and in particular to restore to parks water supplies which have practically entirely disappeared apart from rest areas on major arteries.

The distribution station constitutes a resource for users which permits meeting the obligations of communities as to travelers staying over while avoiding large concentrations of users which is prejudicial to the quality of life.

BRIEF DESCRIPTION OF THE DRAWINGS

Other characteristics and advantages will become apparent from the reading of the detailed description which follows, of an embodiment of the distribution station, given here by way of example and shown in the accompanying drawings, in which.

DETAILED DESCRIPTION OF THE INVENTION

Figure 1:
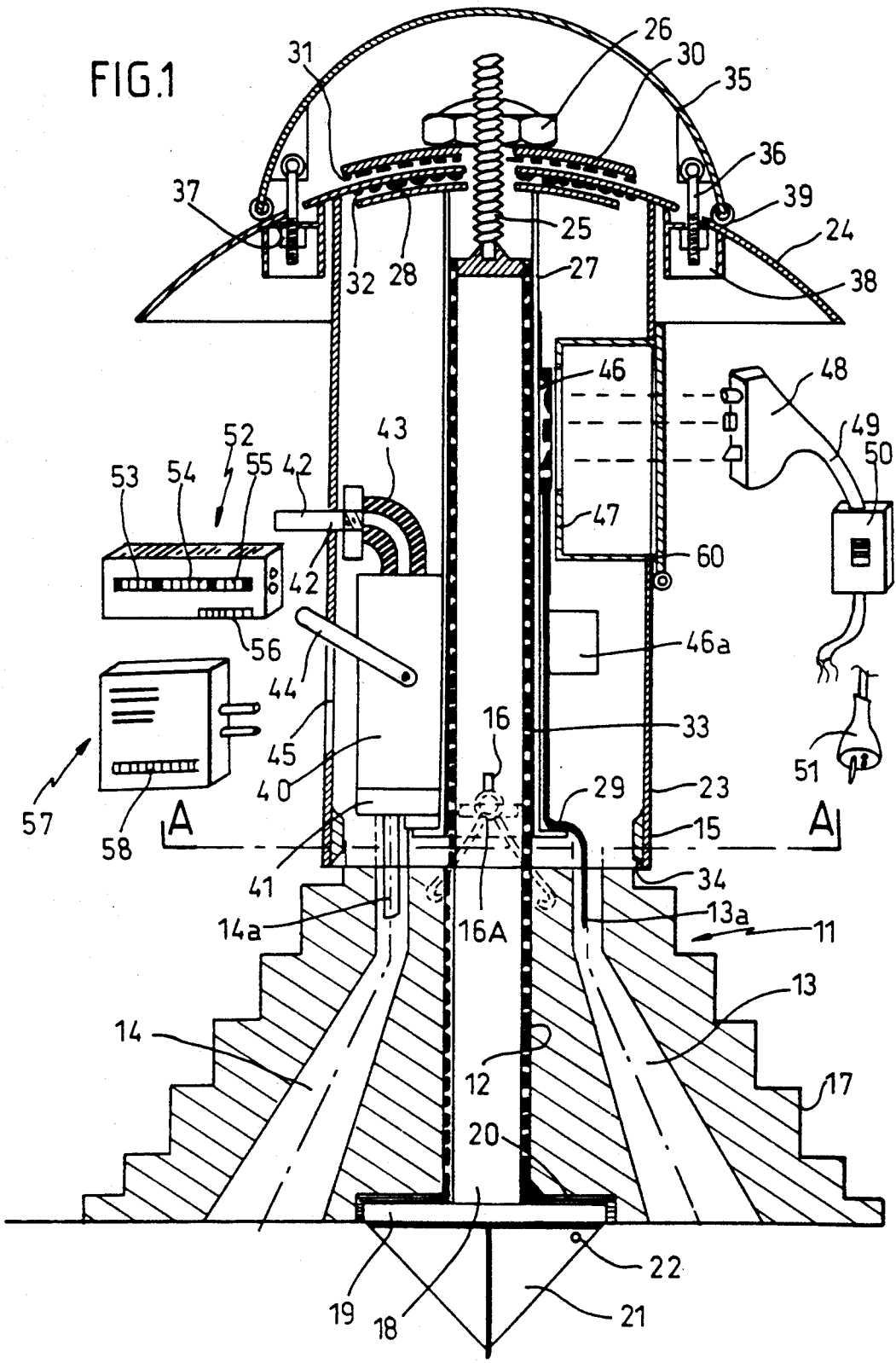
FIG. 1 is a view in elevational cross section showing the different components of the distribution station.
Figure 3:
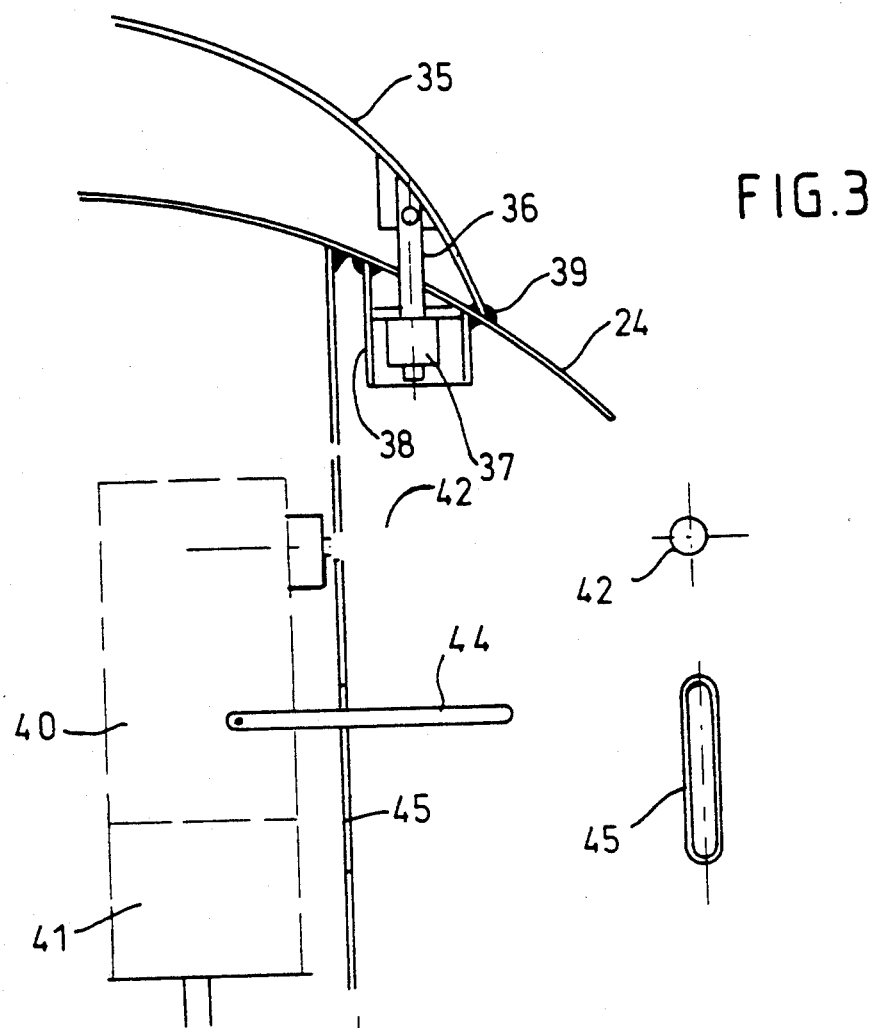
FIG. 3 is a detail view showing in partial elevational cross section with parts broken away, the manner of securement of the second cupola.
Figure 2:
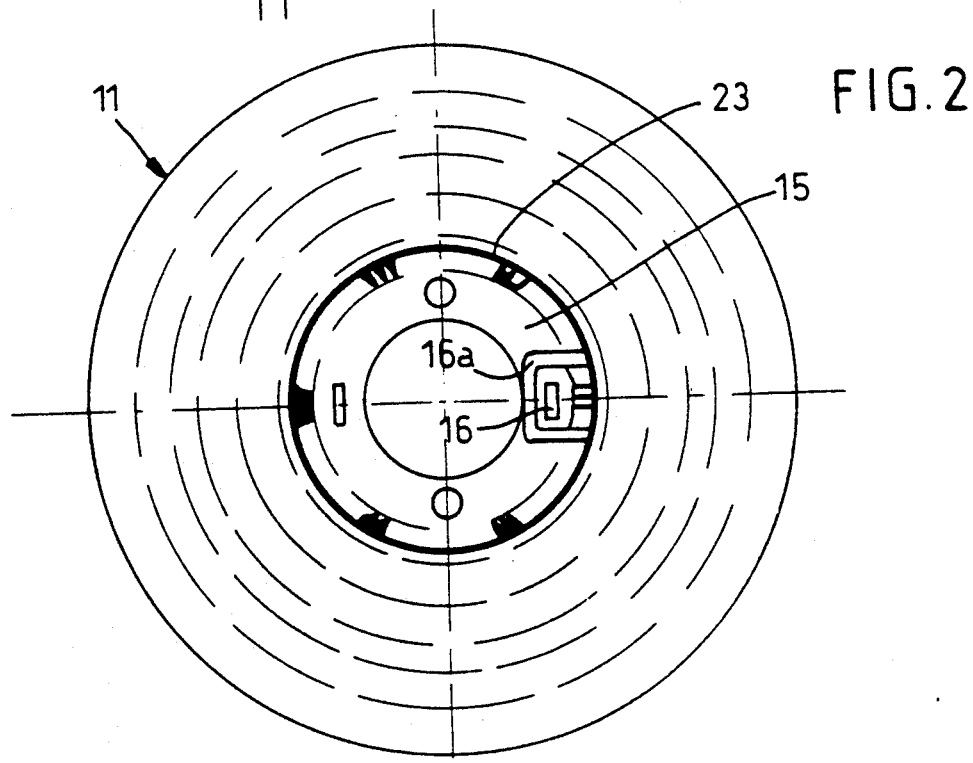
FIG. 2 is a cross-sectional view of the station on line A—A of FIG. 1.
Figure 4:
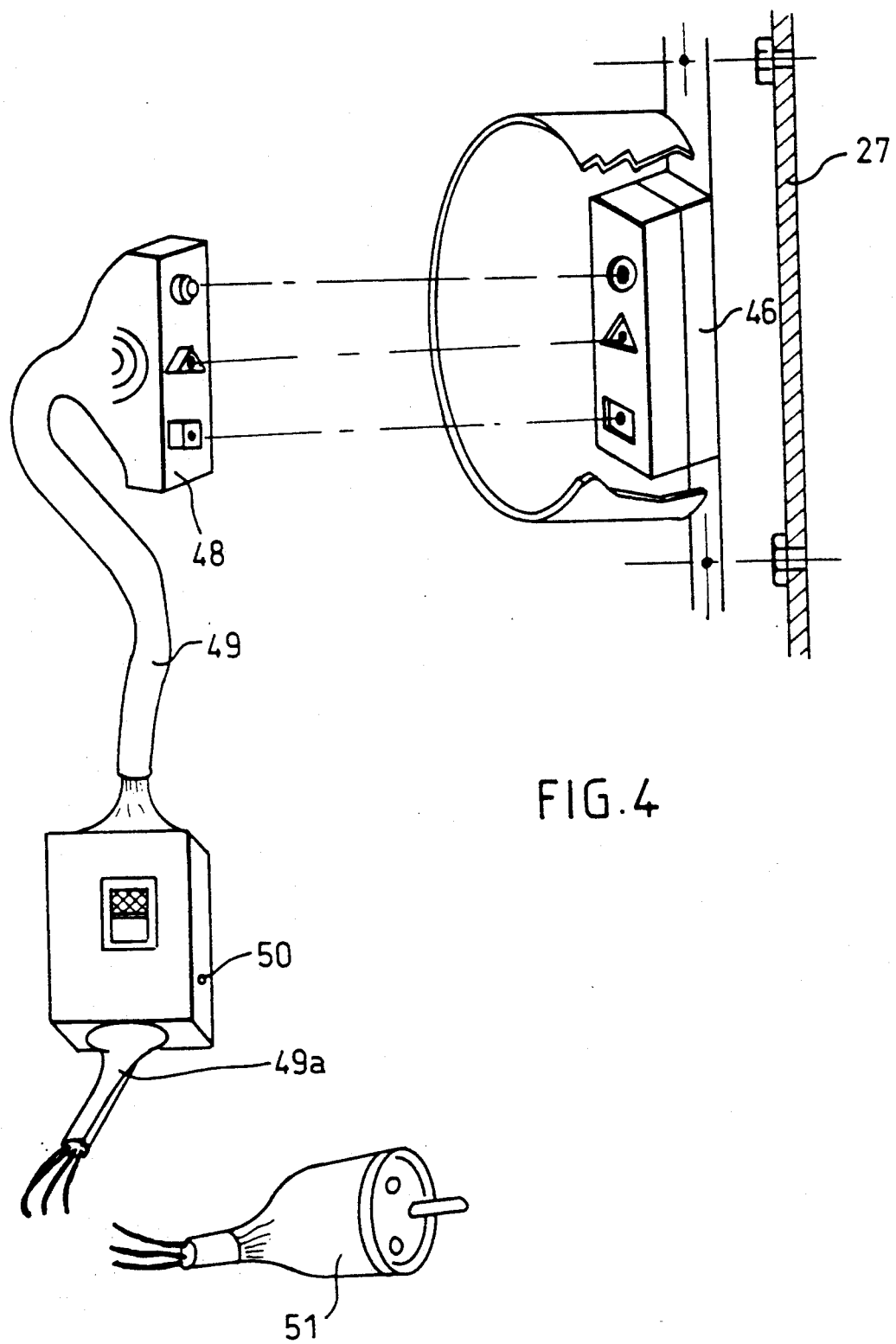
FIG. 4 is a view showing the distribution outlet installed on the station and the user connection.

According to the invention, as shown in FIG. 1, the distribution station for water and/or gas and/or fuel and/or electricity and/or any other fluid is designated by general reference 10.

According to an embodiment which is preferred but not limiting, the distribution station which cannot be vandalized is constituted by a massive foundation 11, for example a concrete block within a generally truncated conical perimeter. The foundation is vertically traversed by an axial passage 12 for the accommodation of a mast 18 which will be described in detail hereafter. The foundation is also traversed by two vertical passages, respectively 13 and 14, adapted to receive a water conduit 14a and an electric conductor 13a. The passages 13, 14 are of generally truncated conical shape, with a large base resting on the ground which permits particularly alignment with the supply conduits for the distribution station. The foundation 11 comprises at its upper end a shouldered step 15, on which is mortised the enclosure which contains the components of the station. It is provided, embedded in the material of construction of the step 15 of the foundation, with anchor rings 16 serving, on the one hand, for retention on the foundation and also for transportation to the job site, on the other hand with means for fixing against rotation the enclosure connected to the foundation.

Externally, the shape of the foundation is preferably a series of steps 17 preventing the support of receptacles of any type. This foundation reduces the perimeter of access to the distributors in the station.

Foundation 11 can have any other shape and can for example be in the form of a truncated cone or a hollow interior pyramid whose vertical passages 13 and 14 adapted to receive the water conduit 14a and the electric conduit 13a are omitted.

The base of the cone or of the pyramid comprises openings which are disposed in alignment with the supply conduits of the distribution station at the time of mounting the supply station, for water, electricity or gas. So as to stabilize the assembly of the distribution station, the hollow foundation is filled from its upper end with sand or other material at the time of installation of the distribution station. This other embodiment of the foundation facilitates by its weight the transport of said foundations and permits particularly their stacking.

The foundation in this simplified embodiment also comprises at its upper end a shouldered step 15 on which is mortised the enclosure which contains the components of the station.

The mast 18 which passes through the foundation comprises at its lower portion a bearing plate 19 which is disposed in a mortise 20 of the foundation. The plate is downwardly extended by an anchoring blade 21 in the soil but which serves also as a ground 22 for the electrical installation of the distribution station.

This blade 21 can also have on its outer surface screw threading permitting screwing of said blade into a tapped socket buried in the ground.

The mast 18 extends vertically to the vicinity of the top of the distribution station for the assembly of the enclosure and the foundation.

The enclosure 23 of the station is preferably in the form of a cylindrical sleeve, for example a tube of steel or of plastic or composite material as a function of the intended use of the station. The upper portion of the sleeve 23 is closed by a first cupola 24 preferably in the form of a dome overlying the perimeter of enclosure 23 to form not only a protection against forced entry but also a protection against rain.

The cupola 24 and thus the sleeve 23 are secured to the mast 18 and to the foundation 11 by means of a threaded rod 25 integral with the head of the mast and a nut 26 preferably of anti-gripping shape of the type of those of the so-called anti-theft type used for example for the securement of automobile wheels.

According to a preferred embodiment, there is provided coaxially with the mast 18 a tubular brace 27 surmounted by a bearing portion 28 matching the bearing surface of cupola 24 and acting as a brace head. Brace 27 rests at its base on a thrust collar 29 secured to the upper portion of the mortise 15 of foundation 11.

A complementary bearing plate is interposed between nut 26 and the convex bearing surface of cupola 24.

According to an arrangement against breaking in, particularly by blows, the principal body of the enclosure or sleeve 23 comprises at least one radial shock absorber and an axial shock absorber.

The axial shock absorber is constituted by two rings 31, 32 of plastic material disposed between cupola 24 and brace head 28 and the cupola and bearing plate 30.

The radial shock absorber is constituted on the one hand by an elastic sleeve 33 disposed coaxially of the mast, between mast 18 and brace 27, on the other hand, of resilient lugs 34 disposed between the sleeve 23 of the enclosure body and the centering step 15 of the foundation which receives said sleeve.

The securement means of the cupola 24 of the enclosure are enclosed in a second protective cupola 35 superposed on the first. The cupolas 24 and 35 are secured to each other by threaded bolts 36 movably secured to the second cupola to facilitate mounting. The bolts receive non-grippable nuts as described above, disposed in cylindrical housings permitting gripping only with a key matching the nut 37. Preferably there is provided a sealing joint 39 between the cupolas 24 and 35.

Figure 5:
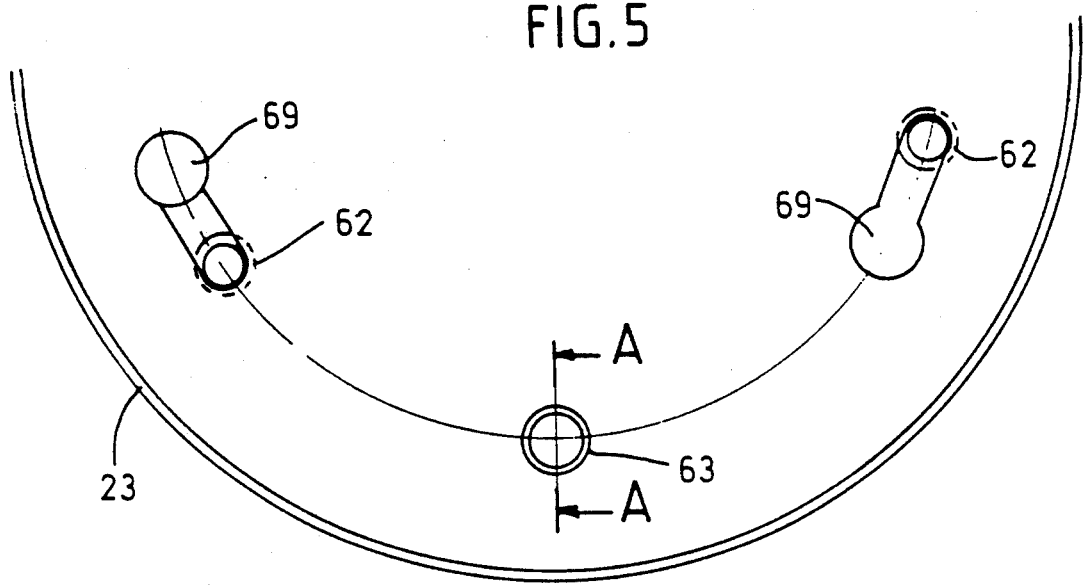
FIG. 5 is a view from above showing another manner of securement of the cupola on the enclosure.
Figure 6:
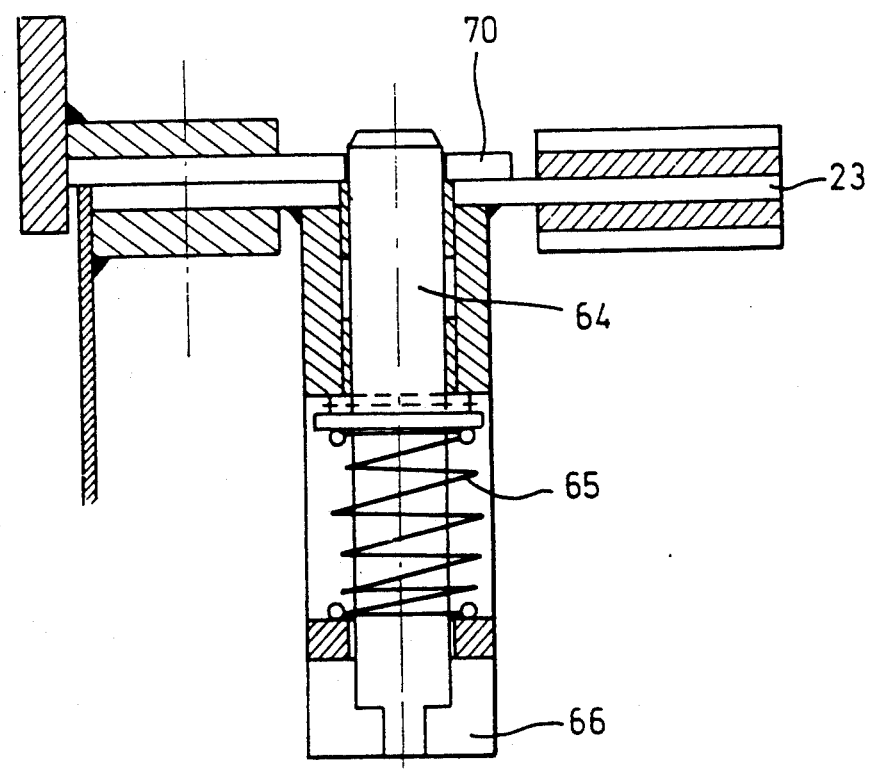
FIG. 6 is a cross-sectional view of the securement on line A—A of FIG. 5.

According to another embodiment of the invention, the cupolas 24 and 35 constitute one and the same piece 24 in the form of a dome slightly overlying the outline of the enclosure 23. Said piece 24 secured to mast 18 and to foundation 11 by means of a screwed rod 25 as has been previously described also comprises on its internal periphery at least two headed lugs 62 and a recess. The upper end of the enclosure 23 comprises an internal flange having at least two openings 69 of oblong shape as seen in FIG. 5, said openings being adapted to receive the head of lugs 62 of the cupola 24. The headed lugs 62 are introduced into the circular section of large diameter of the opening 69 and are then brought by rotation of the cupola 24 into the narrow end of the opening 69. In this position which is that shown in FIG. 5, the headed lugs lock the cupola 24 to the enclosure 23. Thus, these headed lugs 62 have a projecting peripheral portion which retains them within the opening 69. The enclosure 23 comprises also at the level of this internal flange an orifice 63 adapted to come into registry with the opening of the cupola 24 in locked position of the cupola 24 on the enclosure 23. This orifice 63 is elongated toward the interior of the enclosure 23 by guide sheaths shown in FIG. 6. This guide sheath comprises a recess at the interior of which the headed lug 64 can move, said headed lug resting on a support itself connected to a spring 65. The displacement of said lug 64 is controlled by an electromagnet (not illustrated) which is located at 66. In the rest position, that is to say non-excited (or not supplied) position of the electromagnet, the lug 64 is in the position shown in FIG. 6. In this position, the lug 64 passes through the orifice 63 of the enclosure 23 and the opening of the cupola 24 such that it prevents rotation of the cupola 24 relative to enclosure 23. Also in this position, the lugs 62 are disposed in locked position according to FIG. 5. As a result, the unlocking or disassembly of the enclosure 23 and the piece 68 can be effected only during excitation of or current supply to the electromagnet which will permit displacement of the lug 64 downwardly in FIG. 6 so as to permit cupola 24 to turn relative to enclosure 23. This supply to the electromagnet is remotely controlled by an authorized person. Thanks to this arrangement of looking under electrical control, the security of the outlet is ensured. Of course other locking arrangements can be used.

The enclosure of the station contains water distributor 40, for example a quarter-turn valve 40 connected to the supply conduit 14a via an electrovalve 41, this electrovalve being adapted to be controlled from a short distance by a magnetic or infrared control which will be described later in detail.

The outlet of valve 40 empties outside sleeve 23 via a flexible conduit 42 connected removably to the outlet 43 of the valve. Manual control of the valve is effected by a flat lever 44 passing through a narrow window 45 so as to preclude access to the valve body.

The mounting of the water distribution conduit is effected movably elastically.

The enclosure of the station also contains an electrical distribution outlet 46 of the magnetic connection type known per se. Access to this outlet is by a tubular guide socket 47 whose cross section matches that of the user's connection 48. The tubular guide socket 47 is closed for example by an access door 60. This door preferably comprises a reset lever (not shown) so arranged that when the door is opened for access to the outlet 46, said lever actuates resetting of a breaker disposed within the enclosure adjacent the outlet. Said door also comprises return means such as a spring which permits resetting the door in closed position, which is to say in a position obstructing the guide socket 47. The door and its constructional features permit avoiding destruction of the electrical distribution outlet 46 by vandalism as well as its protection against the elements. There is provided, upstream of the distribution outlet 46 a switch 46a controlled magnetically or by infrared. The user's connection 48 is extended by a conductor 49 that can be controlled by a switch 50 itself having a conductor 49a extending therefrom to a conventional plug 51.

Electrovalve 41 and switch 46a are controlled from a short distance by a magnetic control 52.

This control, upon receipt of the fee, permits use of the distribution station.

The control can for example include a recording meter 53, a meter 54 for electric consumption, a meter 55 for water consumption as well as a totalizer 56 for the unconsumed portion of the reserve.

The control, once activated, is at the disposal of the user who can pay to use the station until its supply is exhausted.

The control 52 coacts with a charge or treatment generator 57, accessible to the management of the distribution station or stations. The generator comprises a numerical keyboard 58 permitting displaying on the control 52 the quantities of electricity and water consumed by the user.

Of course, the invention is not limited to the embodiment shown and described above, which can be modified without thereby departing from the scope of the accompanying claims.

Thus, for example, the locking in rotation of the distributor body relative to the foundation can be achieved by means of a ring 16a secured to the sleeve 23 and enclosing the head of the anchoring rings 16 of the foundation.

Similarly, the control 52 could be otherwise arranged such that from the time it authorizes dispensing from one or more consumable supplies until the time of exhaustion of the supplies.

This station may be used for the distribution of other services and can enclose cables for television, telephone, etc.

Also, the places this distribution station can be installed are numerous. One could mention as non-limiting examples a certain number such as harbor locations, unattended parking locations, hospitals particularly for the distribution of oxygen, etc.

The water distribution conduits described above could be modified and made the object of necessary modifications so as to be able to permit the distribution of gas, fuel or any other fluid without departing from the scope of the invention.

I claim:

1. A distribution station for a fluid such as water, gas or fuel and for electricity, particularly for unattended parking areas, said distribution station (10) comprising: an anti-vandalism enclosure (23) sheltering at least one fluid distributor (40) and an electricity distributor (46), said fluid distributor (40) including a fluid distribution conduit (42) and a tap equipped with means (41) for the control of fluid flow actuated by control means (52) according to the amount of payment for the service rendered, said electricity distributor (46) including an electrical current distribution outlet for supplying electricity under the action of regulating means (46a) activated according to the payment for service rendered, said anti-vandalism enclosure (23) sheltering the distributors comprising a massive foundation (11) of limited access perimeter, and an axial mast (18) to prevent sinking, about which is assembled said enclosure (23) whose lower end encloses said foundation so as to create a space coaxially with the mast (18) to contain the distributors of the station and their control accessories.

2. Distribution station according to claim 1, wherein the enclosure (23) sheltering the distributors is in the form of a cylindrical sleeve whose upper part is closed by a cupola (24) bordering the outline of the enclosure, said cupola being secured to the mast (18) and to the foundation (11) by securement means comprising a threaded rod (25) secured to the head of the mast (18) and a nut (26) of nongrippable shape, securing the cupola (24) to the enclosure (23) on said foundation.

3. Distribution station according to claim 2, further including a tubular brace (27) coaxially of the mast (18) and bearing on the one hand on the foundation (11) of the station, and on the other hand on the cupola (24).

4. Distribution station according to claim 3, wherein the cylindrical sleeve (23) constituting the principal body of the enclosure comprises at least one axial shock absorber (31-32) and at least one radial shock absorber (33-34), said axial shock absorber being constituted by blocks of elastic material disposed between the cupola (24) and the head (28) of the brace of the mast, while said radial shock absorber is constituted, on the one hand, by an elastic sleeve (33) disposed coaxially of the mast (18) between the mast and the brace, and on the other hand by elastic lugs (34) disposed between the cylindrical sleeve of the enclosure body an the central summit (15) of the foundation (11).

5. Distribution station according to claim 2, wherein the securement means of the cupola (24) of the enclosure are enclosed in a second protective cupola (35), superposed on the first, said two cupolas being secured to each other by threaded bolts (36) secured to said second cupola and to several non-grippable nuts (37) disposed in cylindrical recesses (38) permitting access by a specific key.

6. Distribution station according to claim 2, wherein the cupola (24) is secured on the enclosure (23) by mechanical locking means (62, 69) unlockable by rotation of the cupola (24) on the enclosure (23), said rotation being effected by retraction of a headed lug (64) controlled by an electromagnetic connected to an electrical control disposed remotely from the distribution station.

7. Distribution station according to claim 1, wherein the means for the control of fluid flow comprising an electrovalve (41) disposed upstream of the tap, said electrovalve (41) being remotely controlled by a magnetic proximity control (52) which includes a memory of the consumed reserve.

8. Distribution station according to claim 1, wherein the regulating means for the supply of electricity comprises a switch (46a) remotely controlled by a magnetic proximity control (52) which includes a memory of the consumed reserve.

9. Distribution station according to claim 1, wherein the fluid distribution conduit (42) is elastically movably mounted between the tap and the enclosure (23) of the station.

10. Distribution station according to claim 1, wherein the electrical current distribution outlet (46) and a user's connection (48) are of the magnetic connection type.

11. Distribution station according to claim 7, wherein the magnetic proximity control (52) comprises a counter (53) to record an order, a counter (54) for electricity consumption, a counter (55) for fluid consumption, a totalizer (56) of the balance of the supply which is not consumed, said control coacting with a recharging generator (57) permitting display of consumption on the magnetic control (52).

* * * * *